United States Patent
Ishii et al.

(10) Patent No.: US 8,705,470 B2
(45) Date of Patent: Apr. 22, 2014

(54) RADIO BASE STATION AND COMMUNICATION CONTROL METHOD

(75) Inventors: Hiroyuki Ishii, Yokohama (JP); Naoto Okubo, Yokosuka (JP)

(73) Assignee: NTT DoCoMo, Inc., Tokyo (JP)

(*) Notice: Subject to any disclaimer, the term of this patent is extended or adjusted under 35 U.S.C. 154(b) by 31 days.

(21) Appl. No.: 13/147,854

(22) PCT Filed: Feb. 4, 2010

(86) PCT No.: PCT/JP2010/051561
§ 371 (c)(1),
(2), (4) Date: Sep. 19, 2011

(87) PCT Pub. No.: WO2010/090239
PCT Pub. Date: Aug. 12, 2010

(65) Prior Publication Data
US 2012/0002577 A1    Jan. 5, 2012

(30) Foreign Application Priority Data

Feb. 4, 2009  (JP) ................................. 2009-024118

(51) Int. Cl.
*H04W 4/00* (2009.01)

(52) U.S. Cl.
USPC ............................ 370/329; 455/451; 455/561

(58) Field of Classification Search
None
See application file for complete search history.

(56) References Cited

U.S. PATENT DOCUMENTS

| 2004/0131029 A1* | 7/2004 | Tobe et al. ................. 370/331 |
| 2008/0037413 A1* | 2/2008 | Gu et al. ..................... 370/210 |
| 2009/0245191 A1* | 10/2009 | Ball et al. ................... 370/329 |
| 2011/0275399 A1* | 11/2011 | Englund et al. ............. 455/513 |

FOREIGN PATENT DOCUMENTS

| JP | 7-203518 A | 8/1995 |
| JP | 2006-217415 A | 8/2006 |
| JP | 2007-151056 A | 6/2007 |
| JP | 2010-526466 A | 7/2010 |
| WO | 2008/135911 A1 | 11/2008 |

OTHER PUBLICATIONS

3GPP TS 36.211 V8.4.0, Sep. 2008, "3rd Generation Partnership Project; Technical Specification Group Radio Access Network; Evolved Universal Terrestrial Radio Access (E-UTRA); Physical Channels and Modulation (Release 8)," 78 pages.

(Continued)

*Primary Examiner* — Brian Roberts
(74) *Attorney, Agent, or Firm* — Osha Liang LLP (57) ABSTRACT

A radio base station includes a power estimate unit configured to estimate a transmission power of an uplink signal in a mobile station (UE), a transmission format determination unit configured to determine a transmission bandwidth and a transmission frequency of the uplink signal as a transmission format of the uplink signal transmitted by the mobile station (UE), and a transmission instruction unit configured to instruct the mobile station (UE) to transmit the uplink signal by using the determined transmission format. The transmission format determination unit is configured to determine the transmission bandwidth of the uplink signal based on an estimation value of the transmission power, and to determine the transmission frequency of the uplink signal based on information relating to a cell with which the mobile station communicates.

3 Claims, 5 Drawing Sheets

(56) References Cited

OTHER PUBLICATIONS

3GPP TS 36.212 V8.4.0, Sep. 2008, "3rd Generation Partnership Project; Technical Specification Group Radio Access Network; Evolved Universal Terrestrial Radio Access (E-UTRA); Multiplexing and channel coding (Release 8)," 56 pages.

3GPP TS 36.101 V8.3.0, Sep. 2008, "3rd Generation Partnership Project; Technical Specification Group Radio Access Network; Evolved Universal Terrestrial Radio Access (E-UTRA); User Equipment (UE) radio transmission and reception (Release 8),".

International Search Report issued in PCT/JP2010/051561, mailed on May 18, 2010, with translation, 3 pages.

Written Opinion issued in PCT/JP2010/051561, mailed on May 18, 2010, 3 pages.

Office Action for Japanese Application No. 2010-549502, mailed Nov. 5, 2013 (4 pages).

* cited by examiner

FIG. 1

RADIO BASE STATION AND COMMUNICATION CONTROL METHOD

BACKGROUND OF INVENTION

1. Technical Field

The present invention relates to a radio base station and a communication control method.

2. Background Art

A next-generation communication schemes such as a Wideband Code Division Multiple Access (W-CDMA) scheme, a High Speed Downlink Packet Access (HSDPA) scheme, and a High Speed Uplink Packet Access (HSUPA) scheme, i.e., a Long Term Evolution (LTE) scheme is studied in the 3GPP, which is a group aiming to standardize the W-CDMA.

As a radio access system using the LTE scheme, it is highly expected to use an OFDMA (Orthogonal Frequency Division Multiplexing Access) scheme for a downlink and to use an SC-FDMA (Single-Carrier Frequency Division Multiple Access) scheme for an uplink.

The OFDMA scheme is a multicarrier transmission scheme in which a frequency band is divided into a plurality of narrow frequency bands (sub-carriers) and data is loaded on each sub-carrier for transmission. The sub-carriers are orthogonalized on the frequency axis and densely arranged, as a result of which it is expected that high-rate transmission can be achieved and the frequency use efficiency can be improved.

The SC-FDMA scheme is a single carrier transmission scheme in which a frequency band is divided for each terminal and frequency bands different among a plurality of terminals are used for transmission. In addition to the fact that the interference between terminals can be reduced easily and effectively, a variation in transmission power can be decreased, and thus, the SC-FDMA scheme is preferable in view of low terminal power consumption, expansion of coverage, etc.

By using FIG. 4, an operation in which an uplink data signal is transmitted in the mobile communication system of the LTE scheme will be explained.

In the uplink in the mobile communication system of the LTE scheme, a radio base station determines a transmission format of a data signal, notifies a mobile station of the transmission format, and notifies the mobile station of a control signal instructing the transmission of the data signal.

When receiving the control signal, the mobile station transmits the data signal to the radio base station at a predetermined timing. In this case, the control signal is referred to as Uplink Scheduling Grant.

Figure 4:
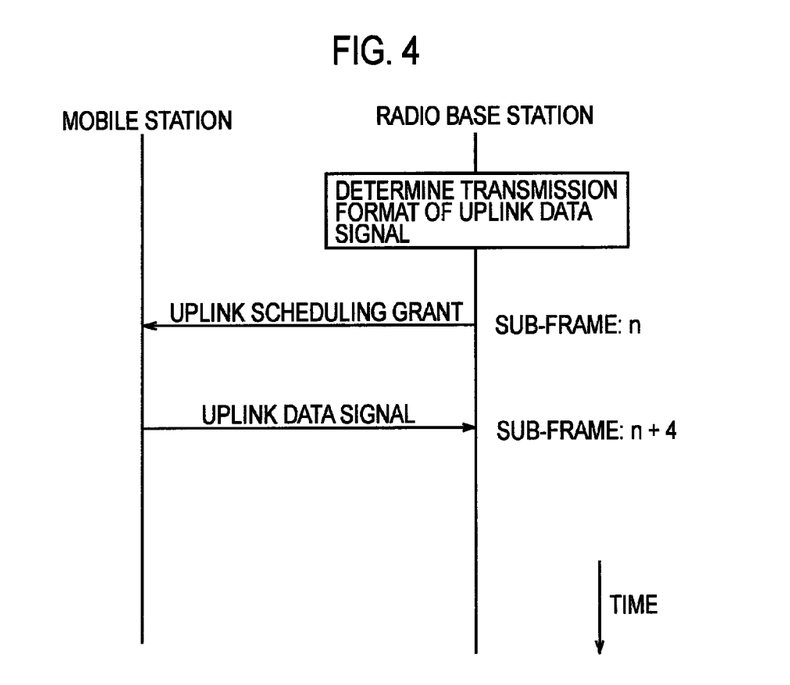
FIG. 4 is a sequence diagram illustrating an operation of a conventional mobile communication system.

In FIG. 4, the predetermined timing is a sub-frame of "n+4", where "n" denotes a sub-frame by which the control signal is transmitted. It is noted that the scheduling grant of the uplink is one of Downlink Control Information (DCI), and as its format (DCI format), "DCI format 0" is employed.

Now, generally, in the uplink in the mobile communication system, there is an upper limit (maximum value) on the transmission power of the mobile station. For example, the maximum transmission power of the mobile station in the mobile communication system of the LTE scheme is 23 dBm.

When the transmission power of the mobile station is subject to the limitation by this maximum transmission power, it is probable that realizing a required SIR at a reception end of the radio base station becomes difficult.

For example, the mobile station located in the cell end needs to transmit the uplink data signal by a transmission power so large as to enable compensation of a pathloss because the pathloss between the mobile station and the radio base station is large; however, when the transmission power is subject to the limitation by the maximum transmission power, it is not possible to sufficiently compensate the above-described pathloss, and as a result, it is difficult to realize the required SIR.

Figure 5:
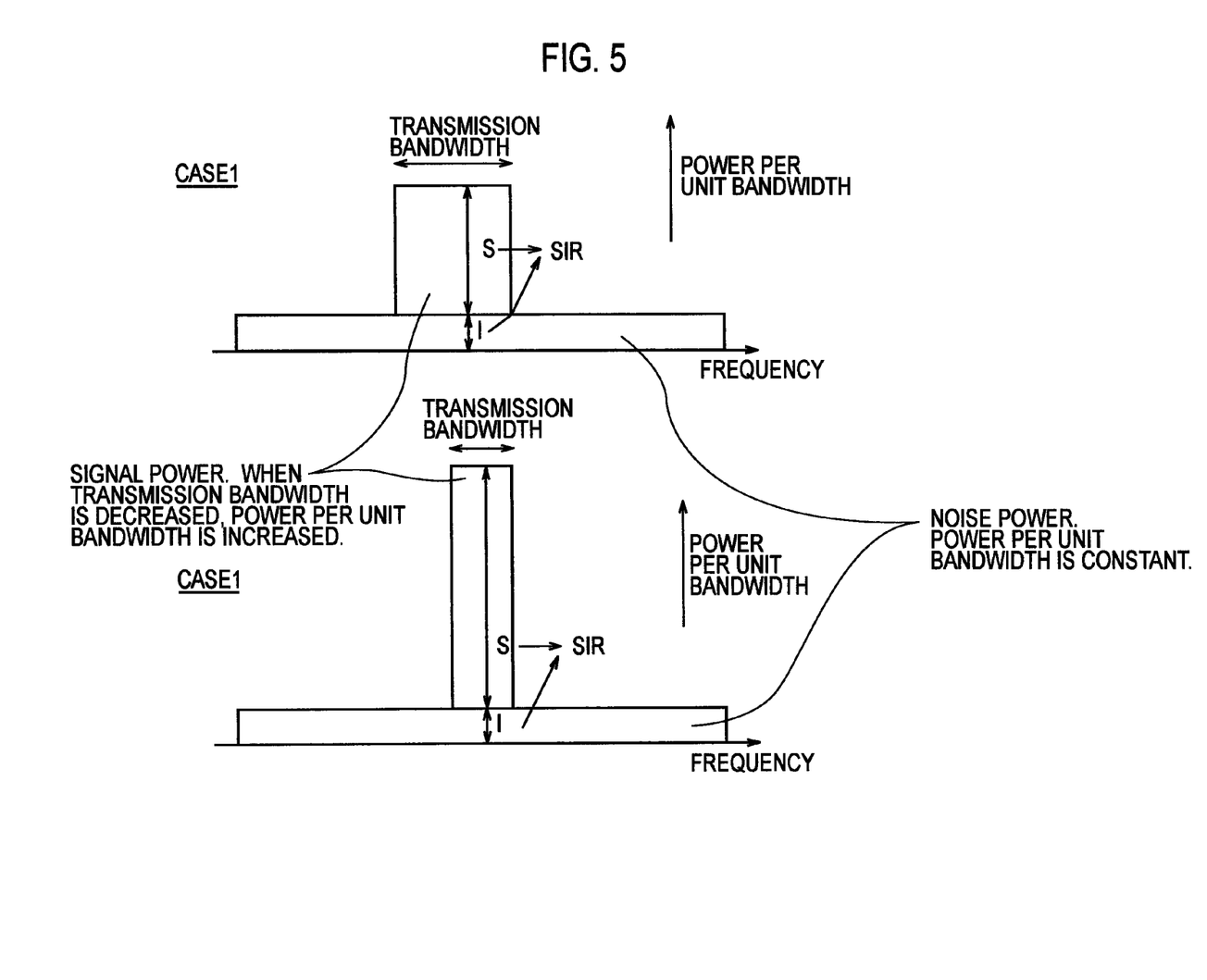
FIG. 5 is a diagram explaining a method of determining a transmission format by the conventional radio base station.

It is noted that for the problem that the required SIR cannot be realized by the above-described limitation of the maximum transmission power, there is a method of improving the SIR at the reception end of the radio base station by decreasing a transmission bandwidth of the uplink data signal, as illustrated in FIG. 5, for example.

That is, in FIG. 5, the transmission bandwidth is decreased in Case 2 as compared to Case 1, and as a result, a signal power per unit bandwidth is large. As a consequence, the SIR at the reception end of the radio base station is improved.

As described above, in an environment, such as a cell end, in which the transmission power of the mobile station in the uplink is subject to the limitation by the maximum transmission power, there is a method of improving the SIR at the reception end of the radio base station by decreasing the transmission bandwidth.

Figure 6:
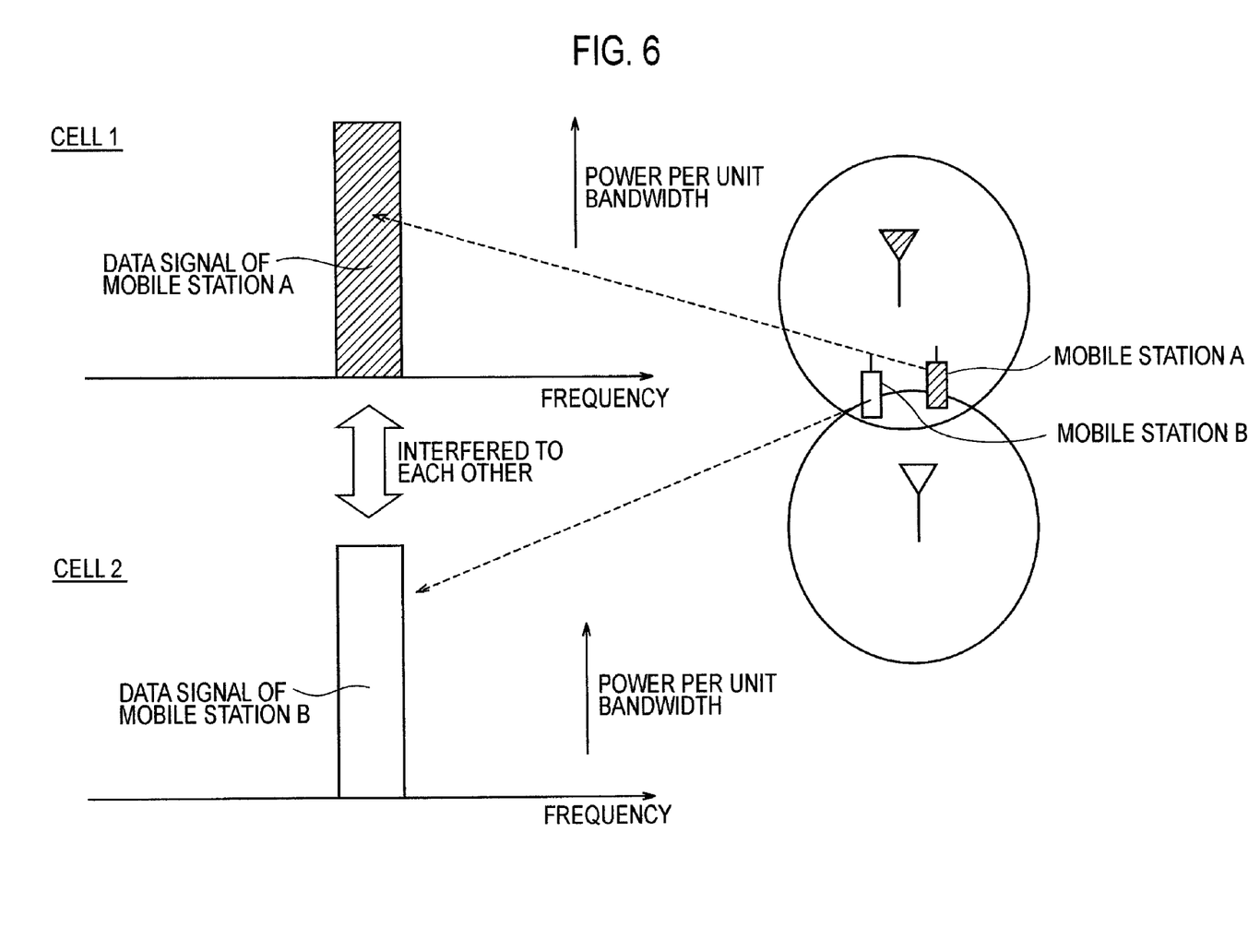
FIG. 6 is a diagram explaining problems inherent in the conventional radio base station.

However, the above-described improvement method has the following problems:

For example, as illustrated in FIG. 6, in two adjacent cells (in an example of FIG. 6, a cell 1 and a cell 2), when the above-described improvement method is applied and the transmission frequencies of the data signal are the same (in the example of FIG. 6, when a transmission frequency of the data signal of a mobile station A of the cell 1 and that of the data signal of a mobile station B of the cell 2 are the same), there is a problem that these signals (in the example of FIG. 6, the signal of the mobile station A and that of the mobile station B) are interfered to each other. It is noted that as described above, the transmission power of the uplink data signal is large at the cell end, and thus, it is understood that the influence caused by the above-described interference is serious.

SUMMARY OF THE INVENTION

Therefore, the present invention is intended to overcome the above-described problem. An object of the present invention is to provide a radio base station and a communication control method, capable of decreasing interference between cells by appropriately setting a transmission frequency and a transmission frequency bandwidth of an uplink data signal based on a predetermined condition.

A first aspect of the present invention is summarized as a radio base station that communicates with a mobile station, including: a power estimate unit configured to estimate a transmission power of an uplink signal in the mobile station; a transmission format determination unit configured to determine a transmission bandwidth and a transmission frequency of the uplink signal as a transmission format of the uplink signal transmitted by the mobile station; and a transmission instruction unit configured to instruct the mobile station to transmit the uplink signal by using the determined transmission format, wherein the transmission format determination unit is configured to determine the transmission bandwidth of the uplink signal based on an estimation value of the transmission power, and to determine the transmission frequency of the uplink signal based on a predetermined condition.

A second aspect of the present invention is summarized as a communication control method in a radio base station that communicates with a mobile station, including: a first step of estimating a transmission power of an uplink signal in the mobile station; a second step of determining a transmission bandwidth and a transmission frequency of the uplink signal as a transmission format of the uplink signal transmitted by the mobile station; and a third step of instructing the mobile station to transmit the uplink signal by using the determined transmission format, wherein in the second step, the transmission bandwidth of the uplink signal is determined based on an estimation value of the transmission power, and the transmission frequency of the uplink signal is determined based on a predetermined condition.

As explained above, according to the present invention, it is possible to provide a radio base station and a communication control method, capable of decreasing interference between cells by appropriately setting a transmission frequency and a transmission frequency bandwidth of an uplink data signal based on a predetermined condition.

DETAILED DESCRIPTION (Radio Base Station According to First Embodiment of the Present Invention)

Figure 1:
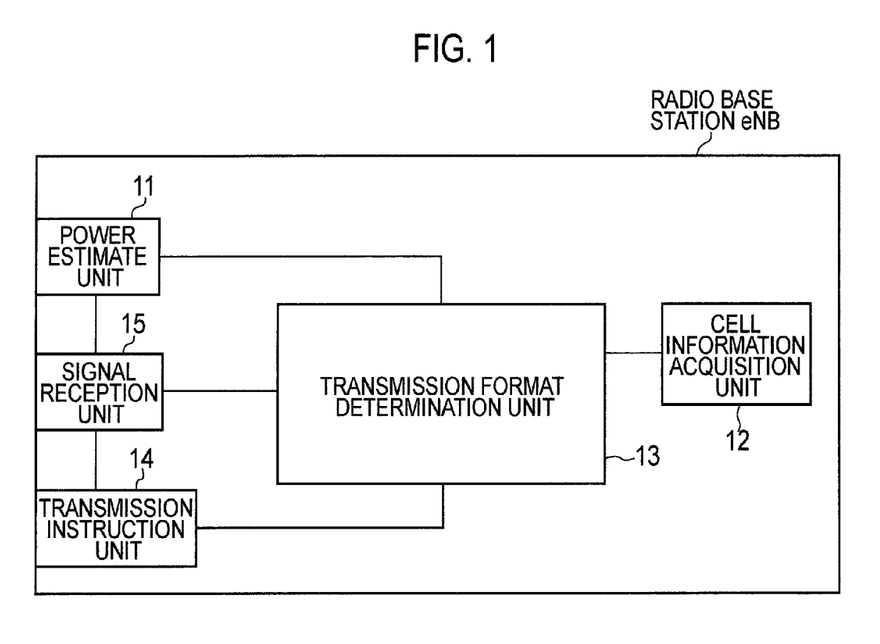
FIG. 1 is a functional block diagram of a radio base station according to a first embodiment of the present invention.
Figure 2:
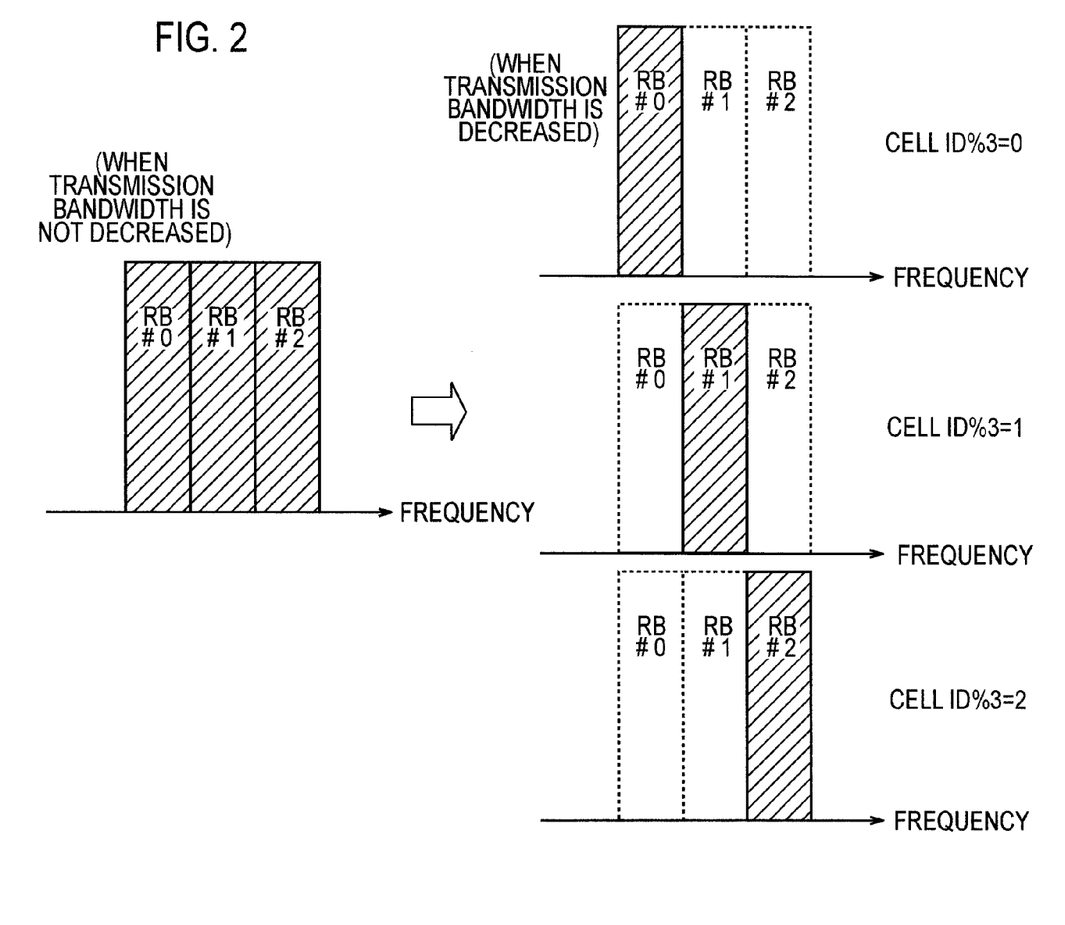
FIG. 2 is a diagram explaining a method of determining a transmission format by a transmission format determination unit of the radio base station according to the first embodiment of the present invention.

With reference to FIG. 1 and FIG. 2, a radio base station eNB according to a first embodiment of the present invention will be explained.

As illustrated in FIG. 1, the radio base station eNB according to this embodiment includes a power estimate unit 11, a cell information acquisition unit 12, a transmission format determination unit 13, a transmission instruction unit 14, and a signal reception unit 15.

The power estimate unit 11 is configured to estimate a transmission power of an uplink signal (uplink data signal) in a mobile station UE.

For example, the power estimate unit 11 may be configured to estimate the transmission power of the uplink signal in the mobile station UE, based on a pathloss between the radio base station eNB and the mobile station UE or a reception power of the uplink signal transmitted by the mobile station UE.

Specifically, firstly, the power estimate unit 11 is configured to calculate an estimation value Txpow of the above-described transmission power according to (Equation 1).

$$Txpow = 10 \cdot \log_{10} N_{allocated} + P_{O\_PUSCH} + \alpha \cdot PL + \Delta_{TF}(TF(i)) + f(i) \quad \text{(Equation 1)}$$

In this case, "$N_{allocated}$" denotes the number of RBs (Resource Blocks) assigned for the transmission of the uplink signal. "$P_{O\_PUSCH}$" is a value defined in TS36.213 that is the 3GPP standard, and is a value set via an external interface. Moreover, "f(i)" denotes a total value of TPC commands transmitted before a sub-frame by which the estimation value Txpow of the transmission power is calculated. Further, "PL" denotes the above-mentioned pathloss. In addition, "α" denotes an attenuation factor defined in TS36.213 that is the 3GPP standard, and is a value set via an external interface. For example, "$\Delta_{TF}$" is to be always set to "0 dB".

It is noted that the power estimate unit 11 may calculate the transmission power of the mobile station UE from "Power Headroom" reported from the mobile station UE, for example, may measure a reception level of the uplink signal from the mobile station UE, and may calculate the aforementioned PL (Pathloss) based on the transmission power and the reception level.

In this case, "Power Headroom" is a signaling, notified from the mobile station UE, indicating a difference between the present transmission power and the maximum transmission power.

Alternately, the power estimate unit 11 may directly calculate the PL (Pathloss) from the value of "Power Headroom". Specifically, the power estimate unit 11 may calculate PL based on the following (Equation 2).

$$PL = \frac{P_{max} - PH - 10\log_{10}M - P_{O\_PUSCH} - \Delta_{TF}(TF(i)) + f(i)}{\alpha} \quad \text{(Equation 2)}$$

In this case, "M" denotes the number of resource blocks of PUSCH for reporting "Power Headroom", "PH" denotes a value designated by "Power Headroom", and "$P_{max}$" denotes the maximum transmission power of the mobile station UE. It is noted that (Equation 2) is derived due to the fact that "Power Headroom" reported from the mobile station UE is defined as follows:

$$PH = P_{max} - \{10 \log_{10}M + P_{O\_PUSCH} + \alpha \cdot PL + \Delta TF(TF(i)) + f(i)\}$$

The cell information acquisition unit 12 is configured to acquire information relating to the cell with which the mobile station UE communicates. For example, the cell information acquisition unit 12 is configured to acquire cell identification information (cell ID) that identifies the cell with which the mobile station UE communicates, as the information relating to the cell with which the mobile station UE communicates. Such cell ID may be a cell ID of a physical layer, for example, i.e., Physical Cell ID.

The transmission format determination unit 13 is configured to determine a transmission format of the uplink signal transmitted by the mobile station UE. Examples of the transmission format of the uplink signal include a transmission bandwidth, a transmission frequency, etc., of the uplink signal.

It is noted that the transmission bandwidth of the uplink signal may be the number of resource blocks assigned to the uplink signal, for example. Further, the transmission frequency of the uplink signal may be a resource block number assigned to the uplink signal, for example.

In this case, in the following description, the number of mobile stations UE multiplexed within the same sub-frame, the reception quality for each band relating to the mobile station UE, more specifically, a group of resource blocks determined based on SIR, etc., is defined as Temporary RB Group.

More specifically, for example, if the number of mobile stations UE multiplexed within the same sub-frame is "3", then the number of RBs of Temporary RB Group of a single mobile station UE may be a third of the number of RBs of the system bandwidth, for example.

In this case, the transmission bandwidth assigned to a single UE, i.e., the number of the resource blocks, is a value obtained by equally dividing the system band by the number of mobile stations UE multiplexed within the same subframe.

Moreover, for example, a frequency-wise position of such Temporary RB Group may be set to a sub-band having the highest reception SIR based on the reception SIR of each sub-band.

In this case, the sub-band indicates a divided band obtained by dividing the system band into a plurality of bands. It is noted that the reception SIR of the sub-band may be determined by a reception SIR of a sounding reference signal transmitted from the mobile station UE, for example.

In the following description, a process in which in the transmission format determination unit 13, the transmission bandwidth of Temporary RB Group (the number of resource blocks) is decreased based on the transmission power of the uplink signal, and the transmission frequency (resource block number) is determined will be explained.

Specifically, the transmission format determination unit 13 is configured to determine the transmission bandwidth of the uplink signal based on the transmission power of the uplink signal estimated by the power estimate unit 11 (estimation value of the transmission power) and to determine the transmission frequency of the uplink signal based on a predetermined condition.

For example, the transmission format determination unit 13 may be configured to decrease the transmission bandwidth of the uplink signal so that the above-described transmission power is equal to or less than the maximum transmission power. Herein, the transmission power of the uplink signal is to be determined by (transmission bandwidth of the uplink signal)×(transmission power per unit band of the uplink signal).

Further, the transmission format determination unit 13 may be configured to determine the transmission frequency of the uplink signal, based on the information (for example, cell ID) relating to the cell acquired by the cell information acquisition unit 12.

Specifically, the transmission format determination unit 13 is configured to determine the resource block number $N_{allocated}$ that can be transmitted so that the transmission power does not become larger than the maximum transmission power Pmax according to (Equation 3), and to decrease the transmission bandwidth of the uplink signal based on the $N_{allocated}$ i.e., to reduce the number of resource blocks assigned for the transmission of the uplink signal to equal to or less than the $N_{allocated}$, when the estimation value Txpow of the transmission power calculated by the power estimate unit 11 is larger than the maximum transmission power Pmax.

$$N_{allocated} = \max\left(1, \text{floor}\left(10 \frac{(P_{max} - (P_{O\_PUSCH} + \alpha \cdot PL + \Delta_{TF}(TF(i)) + f(i)))}{(10)}\right)\right) \quad \text{(Equation 3)}$$

For example, the transmission format determination unit 13 is configured to delete the resource block within "Temporary RB Group" until the number of resource blocks assigned for the transmission of the uplink signal is equal to or less than $N_{allocated}$.

For example, the transmission format determination unit 13 may be configured to delete the resource block within "Temporary RB Group" until the number of resource blocks assigned for the transmission of the uplink signal is equal to or less than $N_{allocated}$ and the number of the sub-carriers has a factor of 2, 3, and 5 only.

As illustrated in FIG. 2, the transmission format determination unit 13 is configured to delete resource blocks RB#0 to #2 within "Temporary RB Group" in order from a resource block having the largest frequency, in a cell specified by a PCI (Physical Cell ID) of which the value is "0" when divided by 3.

In an example of FIG. 2, the transmission format determination unit 13 is configured to delete the resource blocks RB#1 and #2, from among the resource blocks RB#0 to #2 within "Temporary RB Group", in the cell specified by the PCI of which the value is "0" when divided by 3.

Further, the transmission format determination unit 13 is configured to delete the resource blocks RB#0 to #2 within "Temporary RB Group" in order from a resource block having the smallest frequency, in a cell specified by a PCI of which the value is "2" when divided by 3.

In an example of FIG. 2, the transmission format determination unit 13 is configured to delete the resource blocks RB#0 and #1, from among the resource blocks RB#0 to #2 within "Temporary RB Group", in the cell specified by the PCI of which the value is "2" when divided by 3.

Moreover, the transmission format determination unit 13 is configured to delete the resource blocks RB#0 to #2 within "Temporary RB Group" in order from the resource block having the largest frequency, the resource block having the smallest frequency, the resource block having the second largest frequency, the resource block having the second smallest frequency, . . . , for example, in the cell specified by the PCI of which the value is "1" when divided by 3.

In an example of FIG. 2, the transmission format determination unit 13 is configured to delete the resource blocks RB#0 and #2, from among the resource blocks RB#0 to #2 within "Temporary RB Group", in the cell specified by the PCI of which the value is "1" when divided by 3.

It is noted that in the above-described example provides a case where the number of resource blocks assigned for the transmission of the uplink signal before deleting the resource block, is "3"; however, a value other than "3" ("5", "7", or other values) may be acceptable.

In this case, the transmission format determination unit may be configured not to consider "MPR (Maximum Power Reduction)" defined in TS36.101 that is the 3GPP standard, upon determining the transmission power of the uplink signal.

Alternately, the transmission format determination unit 13 may be configured, upon determining the transmission power of the uplink signal, to consider "MPR (Maximum Power Reduction)" defined in TS36.101 that is the 3GPP standard.

The transmission instruction unit 14 is configured to instruct the mobile station UE to transmit an uplink signal by using the determined transmission format. For example, the transmission instruction unit 14 is configured to perform such an instruction by using downlink control information, i.e., a scheduling grant of the above-described uplink.

The signal reception unit 15 is configured to receive the uplink signal (uplink data signal) transmitted via PUSCH (Physical Uplink Shared Channel) by the mobile station UE.

(Operation of Radio Base Station According to First Embodiment of the Present Invention)

Figure 3:
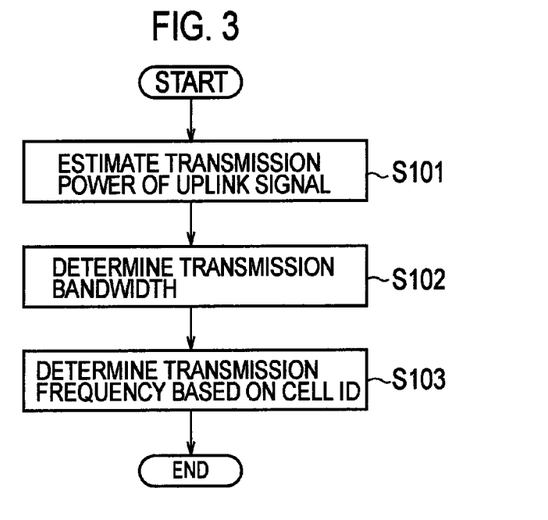
FIG. 3 is a flowchart illustrating an operation of the radio base station according to the first embodiment of the present invention.

With reference to FIG. 3, the operation of the radio base station eNB according to the first embodiment of the present invention will be explained.

As illustrated in FIG. 3, in step S101, the power estimate unit 11 of the radio base station eNB according to this embodiment estimates the transmission power of the uplink signal in the mobile station UE according to (Equation 1).

In step S102, the transmission format determination unit 13 of the radio base station eNB determines the transmission bandwidth of the uplink signal, based on the estimation value of the transmission power of the uplink signal, i.e., according to (Equation 3).

In step S103, the transmission format determination unit 13 of the radio base station eNB determines the transmission frequency of the uplink signal, based on the cell ID that specifies the cell with which the mobile station UE communicates.

(Operation and Effect of Radio Base Station According to First Embodiment of the Present Invention)

According to the radio base station eNB based on the first embodiment of the present invention, it is possible to decrease interference between cells by appropriately setting a transmission frequency and a transmission frequency bandwidth of an uplink signal based on a predetermined condition.

That is, according to the radio base station eNB based on the first embodiment of the present invention, when the estimation value of the transmission power of the uplink signal in the mobile station UE exceeds the maximum transmission power, if a different resource block is deleted from among the resource blocks within "Temporary RB Group" between a plurality of cells to which the identical "Temporary RB Group" is assigned, then it is possible to decrease the interference between cells.

It is noted that in the above-described example, a case where the transmission frequency of the uplink signal is determined based on the cell ID is illustrated; however, instead thereof, as long as the uplink transmission frequency differs from the adjacent cell, the transmission frequency of the uplink signal may be determined by using a method other than described above.

For example, the similar control may be performed when in addition to Physical Cell ID (PCI), ID of a scrambling code applied to each cell, a cell global ID, etc., are used as the cell ID.

The above-mentioned aspects of the embodiment may be expressed as follows:

A first aspect of the embodiment is summarizes as a radio base station eNB that communicates with a mobile station UE, including: a power estimate unit 11 configured to estimate a transmission power of an uplink signal in the mobile station UE; a transmission format determination unit 13 configured to determine a transmission bandwidth and a transmission frequency of the uplink signal as a transmission format of the uplink signal transmitted by the mobile station UE; and a transmission instruction unit 14 configured to instruct the mobile station UE to transmit the uplink signal by using the determined transmission format, in which the transmission format determination unit 13 is configured to determine the transmission bandwidth of the uplink signal based on an estimation value of the above-described transmission power and to determine the transmission frequency of the uplink signal based on a predetermined condition.

In the first aspect of this embodiment, the transmission format determination unit 13 may be configured to decrease the transmission bandwidth of the uplink signal so that the above-described transmission power is equal to or less than the maximum transmission power.

In the first aspect of this embodiment, the transmission format determination unit 13 may be configured to determine the transmission frequency of the uplink signal based on information relating to a cell with which the mobile station UE communicates.

In the first aspect of this embodiment, the information relating to the cell may be identification information of the cell.

A second aspect of the embodiment is summarizes as a communication control method in a radio base station eNB that communicates with a mobile station UE, including: a first step of estimating a transmission power of an uplink signal in the mobile station UE; a second step of determining a transmission bandwidth and a transmission frequency of the uplink signal as a transmission format of the uplink signal transmitted by the mobile station UE; and a third step of instructing the mobile station UE to transmit the uplink signal by using the determined transmission format, wherein in the second step, the transmission bandwidth of the uplink signal is determined based on an estimation value of the above-described transmission power and the transmission frequency of the uplink signal is determined based on a predetermined condition.

The operation of the above-described radio base station eNB and the mobile station UE may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the radio base station eNB and the mobile station UE. As a discrete component, such a storing medium and processor may be arranged in the radio base station eNB and the mobile station UE.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

The invention claimed is:

1. A radio base station that communicates with a mobile station, comprising:
   a power estimate unit that estimates a transmission power of an uplink signal transmitted by the mobile station, based on power headroom reported from the mobile station;
   a transmission format determination unit that determines a transmission bandwidth and a transmission frequency of the uplink signal as a transmission format of the uplink signal transmitted by the mobile station; and a transmission instruction unit that instructs the mobile station to transmit the uplink signal by using the determined transmission format, wherein the transmission format determination unit determines the transmission bandwidth of the uplink signal based on an estimation value of the transmission power, and determines the transmission frequency of the uplink signal based on information relating to a cell with which the mobile station communicates, the transmission format determination unit decreases the transmission bandwidth of the uplink signal so that the estimated transmission power becomes equal to or less than a maximum transmission power, and the transmission format determination unit changes a scheme for determining resource blocks to be decreased based on a cell ID, when the transmission bandwidth of the uplink signal is determined to be decreased.

2. The radio base station according to claim 1, wherein the information relating to a cell is identification information of the cell.

3. A communication control method in a radio base station that communicates with a mobile station, comprising:

a first step of estimating a transmission power of an uplink signal transmitted by the mobile station, based on power headroom reported from the mobile station;

a second step of determining a transmission bandwidth and a transmission frequency of the uplink signal as a transmission format of the uplink signal transmitted by the mobile station; and a third step of instructing the mobile station to transmit the uplink signal by using the determined transmission format, wherein in the second step, the transmission bandwidth of the uplink signal is determined based on an estimation value of the transmission power, and the transmission frequency of the uplink signal is determined based on information relating to a cell with which the mobile station communicates, in the second step, the transmission bandwidth of the uplink signal is decreased so that the estimated transmission power becomes equal to or less than a maximum transmission power, and a scheme for determining resource blocks to be decreased is changed based on a cell ID, when the transmission bandwidth of the uplink signal is determined to be decreased.

* * * * *